Sept. 28, 1971  R. H. COLBY  3,608,427
BOLT LOCKING SYSTEM
Filed April 7, 1969  6 Sheets-Sheet 1

Inventor:
Richard H. Colby,
by Barlin S Church
His Attorney.

Sept. 28, 1971  R. H. COLBY  3,608,427
BOLT LOCKING SYSTEM
Filed April 7, 1969  6 Sheets-Sheet 5
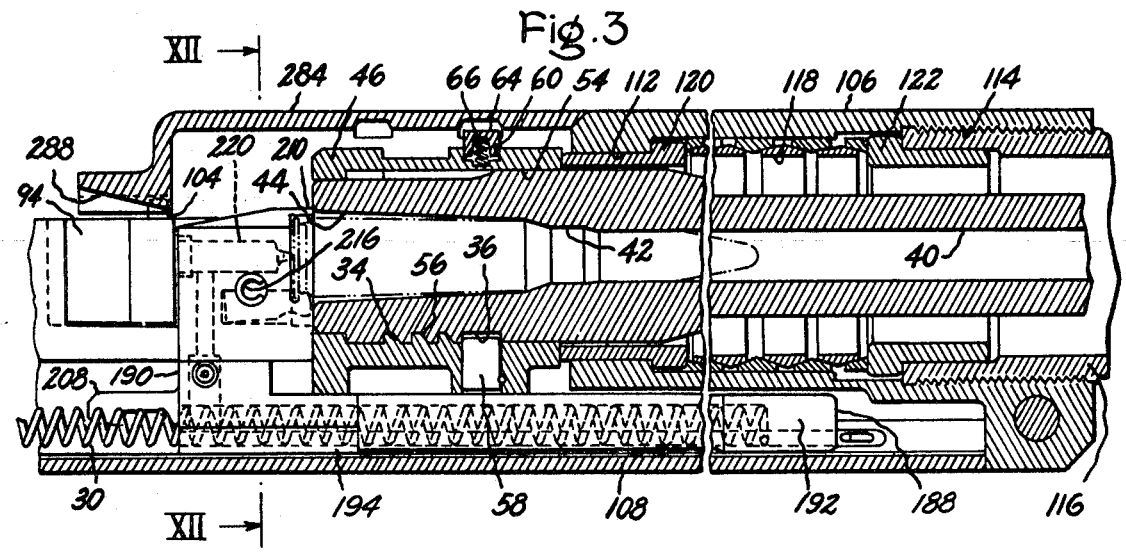
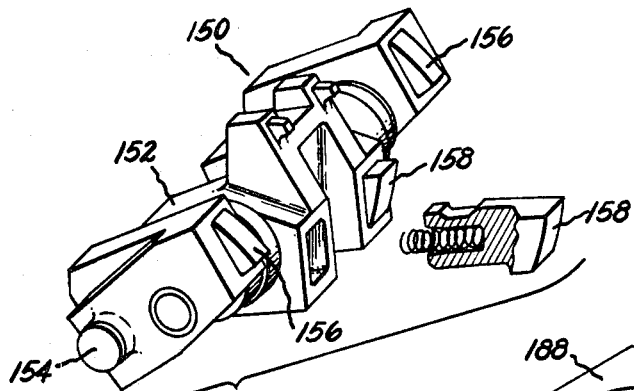
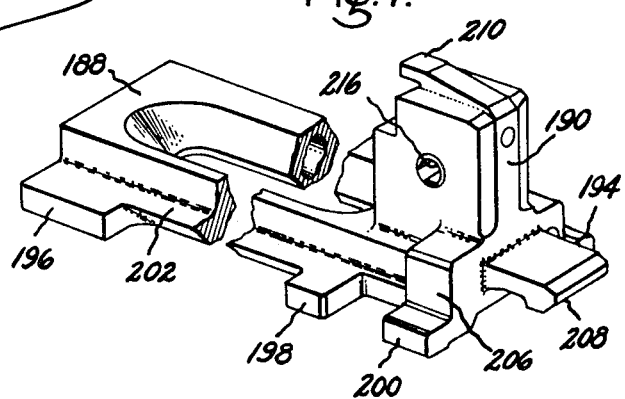
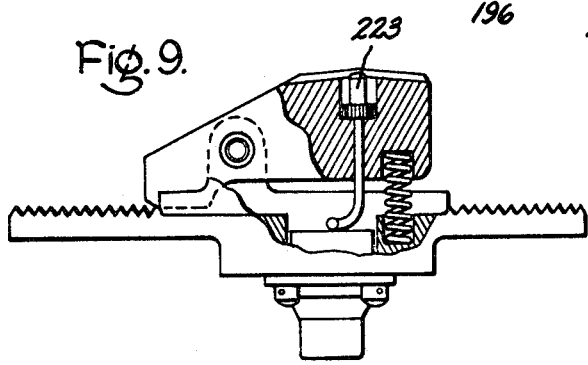
Inventor:
Richard H. Colby,
by *Barlin L Church*
His Attorney.

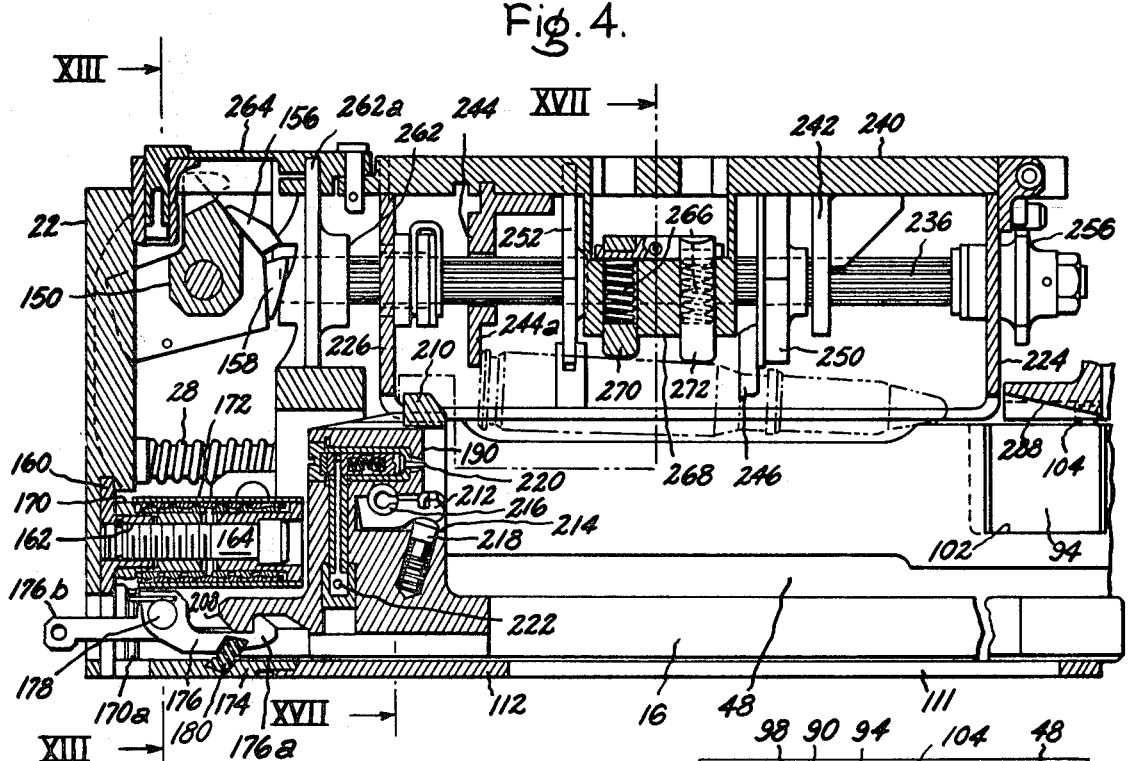
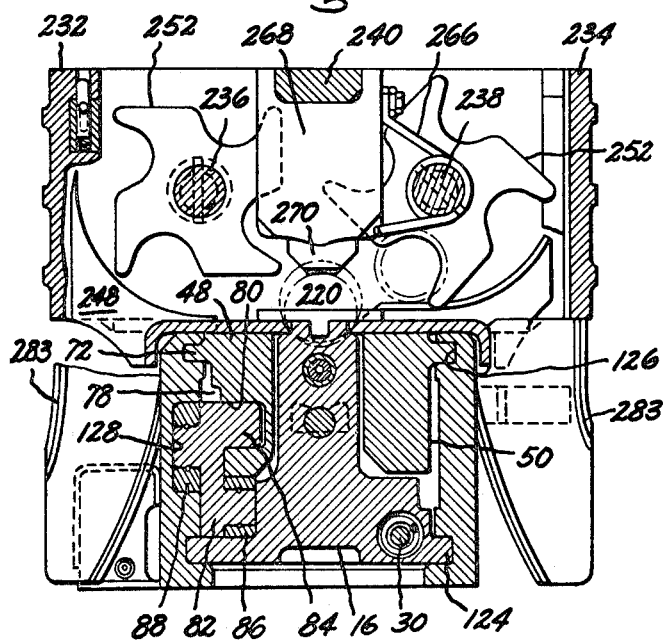
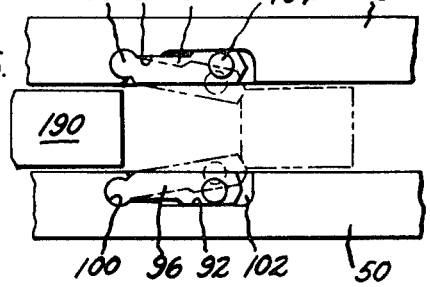
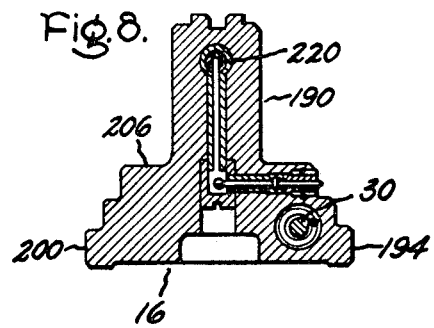

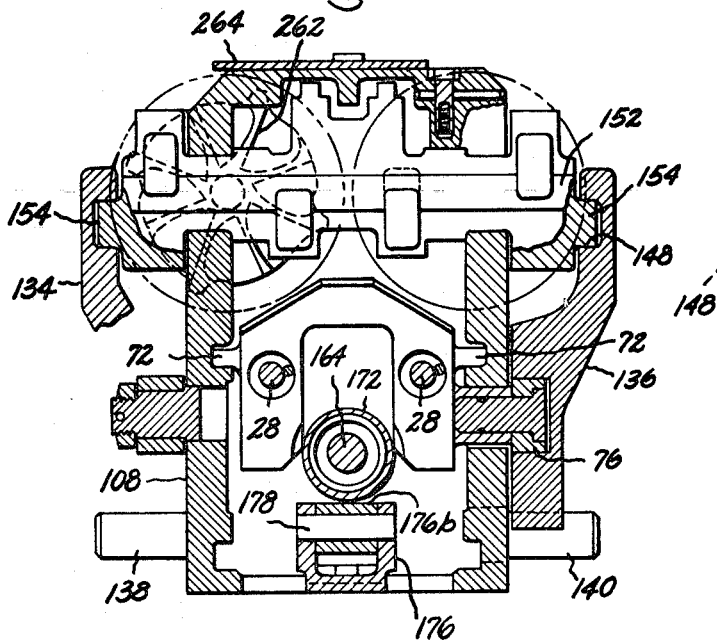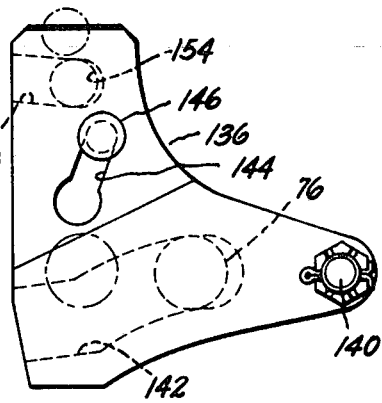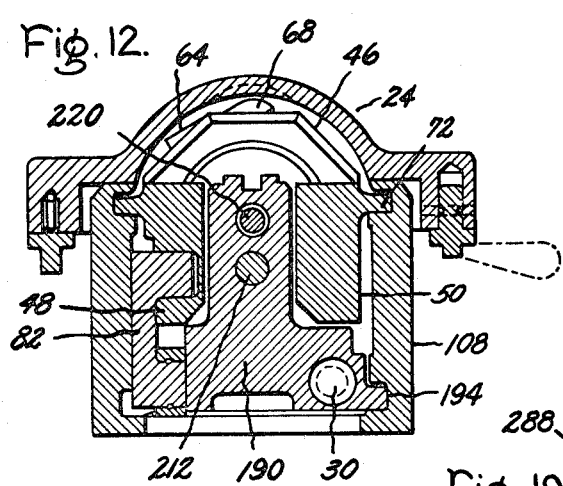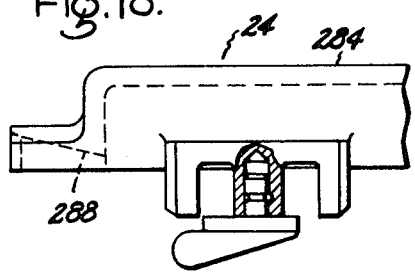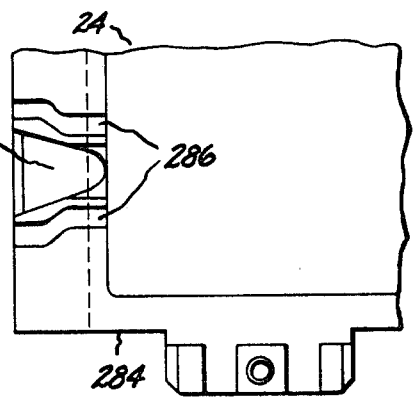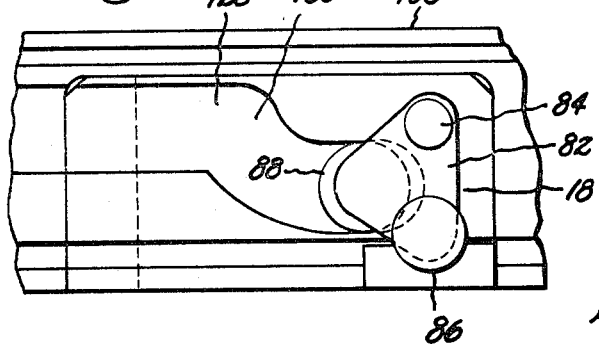
Inventor:
Richard H. Colby,
by his Attorney

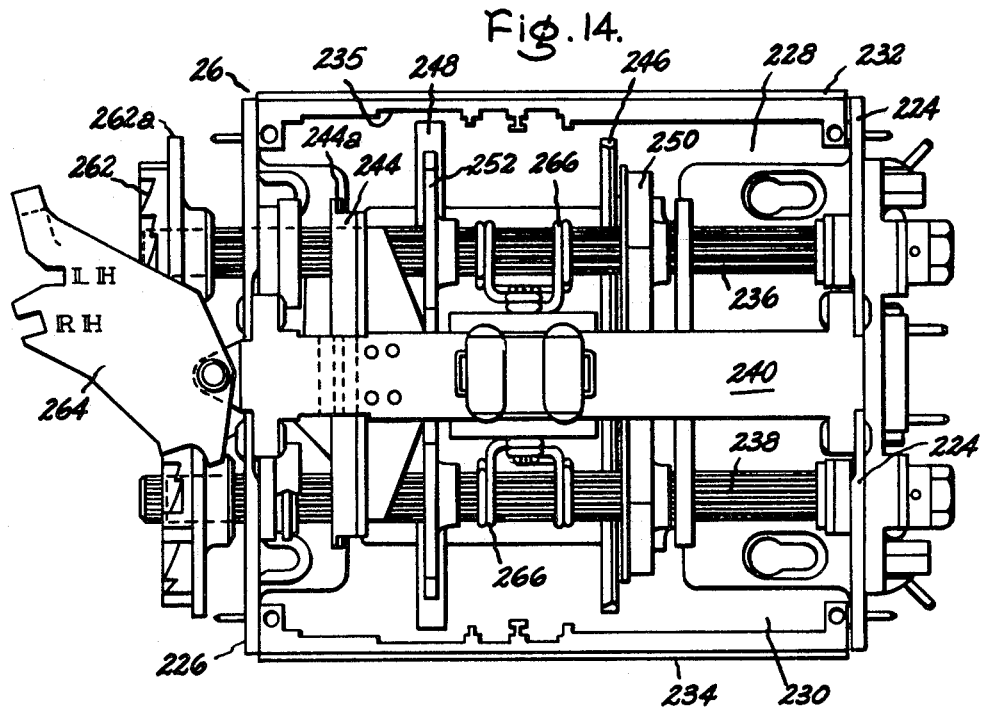
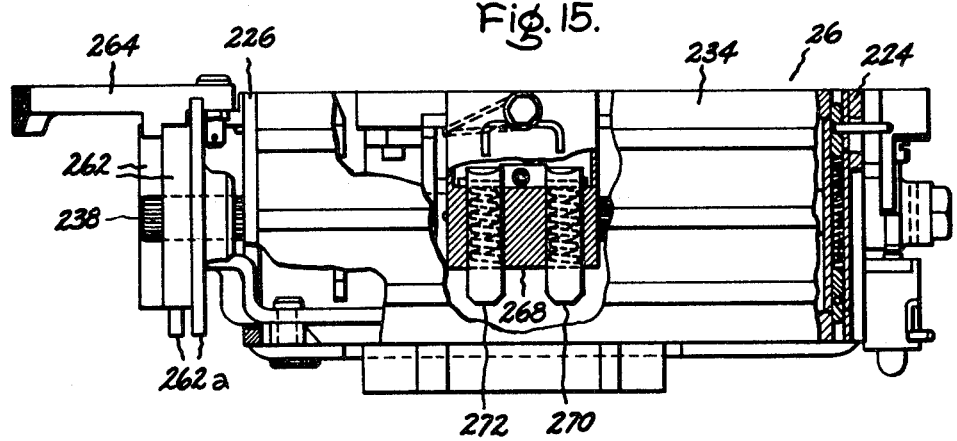
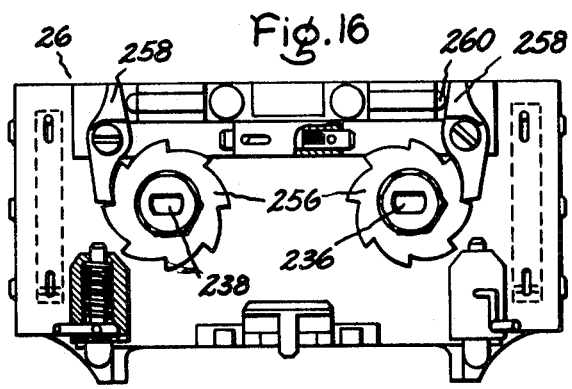

United States Patent Office
3,608,427
Patented Sept. 28, 1971

3,608,427
BOLT LOCKING SYSTEM
Richard H. Colby, Hamden, Mass., assignor to
General Electric Company
Filed Apr. 7, 1969, Ser. No. 814,083
Int. Cl. F41d 3/00
U.S. Cl. 89—176          4 Claims

ABSTRACT OF THE DISCLOSURE

A machine gun is disclosed having a receiver, a barrel with an extension mounted for recoil movement in the receiver, a bolt having a web mounted for recoil movement in the receiver with a bolt head extending up therefrom into said barrel extension and a cartridge case ejection aperture therein, and locking lugs mounted in the barrel extension and controlled by the receiver for locking the bolt head.

BACKGROUND OF THE INVENTION

(1) Field of the invention

This invention relates to automatic and semiautomatic guns having a reciprocating breech which drives a cartridge feed mechanism.

(2) Description of the prior art

The literature of machine guns is quite extensive. Excellent surveys are found in "The Machine Gun" by George M. Chinn in four volumes, Bureau of Ordnance, Department of the Navy, published by Superintendent of Documents, U.S.G.P.O., 1951, and "Small Arms of the World" by W. H. B. Smith and Joseph E. Smith, published by the Stackpole Company, Eighth Edition, 1966. While each of the modern machine guns described therein has been more or less suited for its purpose, an unsatisfied requirement still exists for a single barreled machine gun having (1) a reliable high rate of fire; and (2) a short aft end, that is, a length from the aft end of the cartridge being in-fed to the aft end of the gun which is shorter than the length of the cartridge.

BRIEF SUMMARY OF THE INVENTION

It is, therefore, an object of this invention to provide a machine gun with a short aft end.

It is a further object of this invention to provide a simple, reliable, recoil operated machine gun with a high rate of fire.

It is a still further object of this invention to provide a rigid, symmetrical locking system for a recoil operated gun with a bolt head of minimum length.

A feature of this invention is the provision of a machine gun having a receiver, a barrel with an extension mounted for recoil movement in said receiver, a bolt having a web mounted for recoil movement in said receiver with a bolt-head extending up therefrom into said barrel extension and a cartridge case ejection aperture therein, and means for locking said bolt to said barrel extension.

BRIEF DESCRIPTION OF THE DRAWINGS

These and other objects, features and advantages of the invention will be apparent from the following specification thereof, taken in conjunction with the accompanying drawing in which:

FIG. 3 is a longitudinal cross-section in elevation of the middle length of the gun of FIG. 1 showing the bolt in battery;

FIG. 4 is a longitudinal cross-section in elevation of the aft length of the gun of FIG. 1 showing the bolt on sear;

FIG. 5 is a top plan view of a detent of the barrel extension assembly showing the locking lugs for the bolt of the gun of FIG. 1;

FIG. 6 is a left inboard view in elevation of a detail of the receiver assembly showing the bolt accelerator and its receiver cam plate of the gun of FIG. 1;

FIG. 7 is a perspective view of the bolt assembly of the gun of FIG. 1;

FIG. 8 is a transverse cross-section in elevation of the bolt assembly of the gun of FIG. 1, taken through the electrical firing pin circuit;

FIG. 9 is a top plan view of a detent of the receiver assembly of the gun of FIG. 1 showing the electrical contact for the electrical firing pin circuit of the bolt;

FIG. 10 is a right side view in elevation of the right feed drive cam plate of the gun of FIG. 1;

FIG. 11 is a perspective view of the feeder drive assembly of the gun of FIG. 1;

FIG. 12 is a transverse cross-section in elevation taken along plane XII—XII of FIG. 3;

FIG. 13 is a transverse cross-section in elevation taken along plane XIII—XIII of FIG. 4;

FIG. 14 is a top plan view of the feeder assembly of the gun of FIG. 1;

FIG. 15 is a right side view in elevation of the feeder assembly of FIG. 14;

FIG. 16 is a front view in elevation of the feeder assembly of FIG. 14;

FIG. 17 is a transverse cross-section in elevation taken along plane XVII—XVII of FIG. 4;

FIG. 18 is a right side view in elevation of a detail of the locking cam assembly of the gun of FIG. 1; and FIG. 19 is a bottom plan view of a detail of the locking cam assembly of FIG. 18.

THE PREFERRED EMBODIMENT

Figure 1:
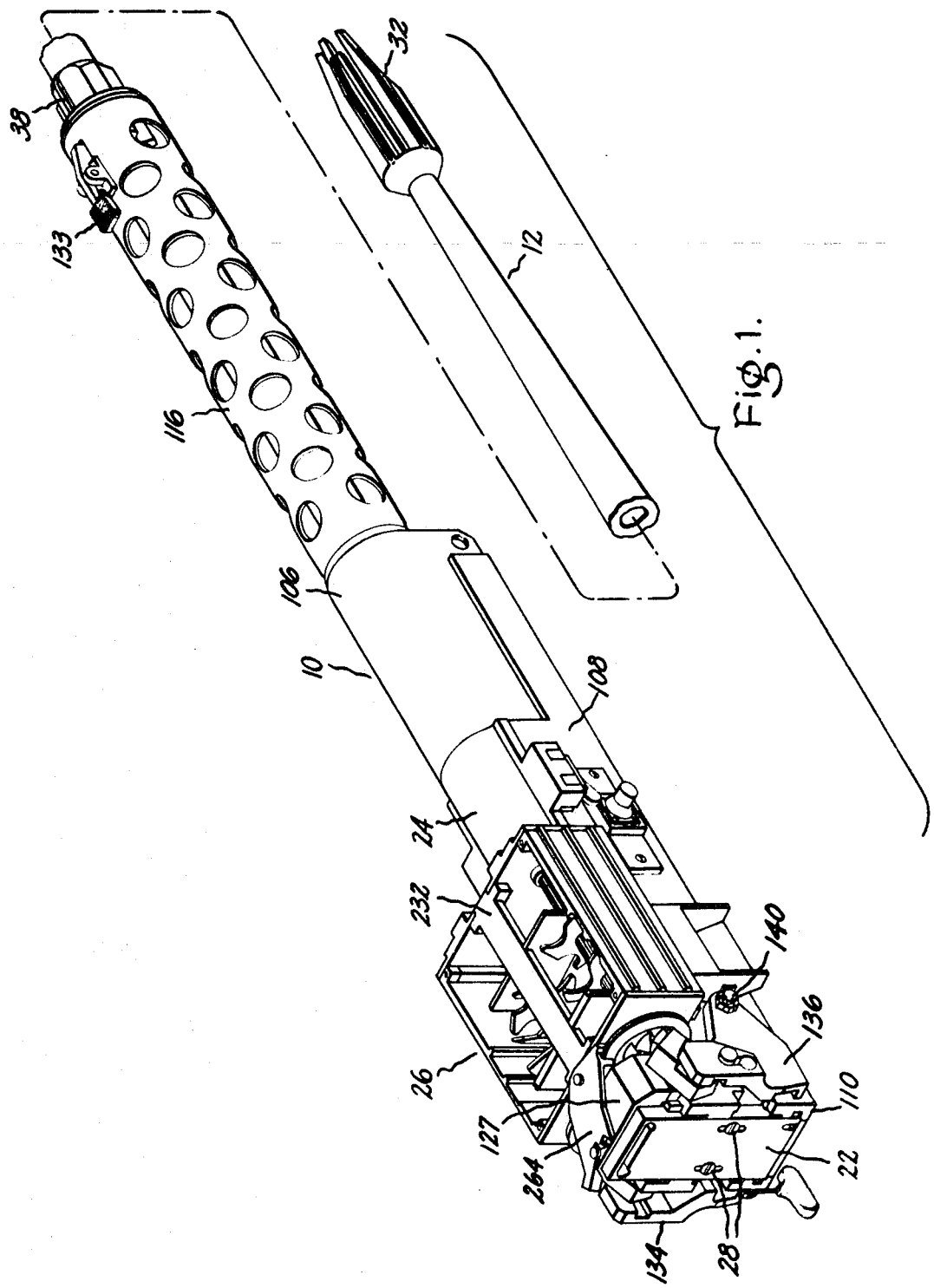
FIG. 1 is a perspective view of a machine gun embodying this invention.
Figure 2:
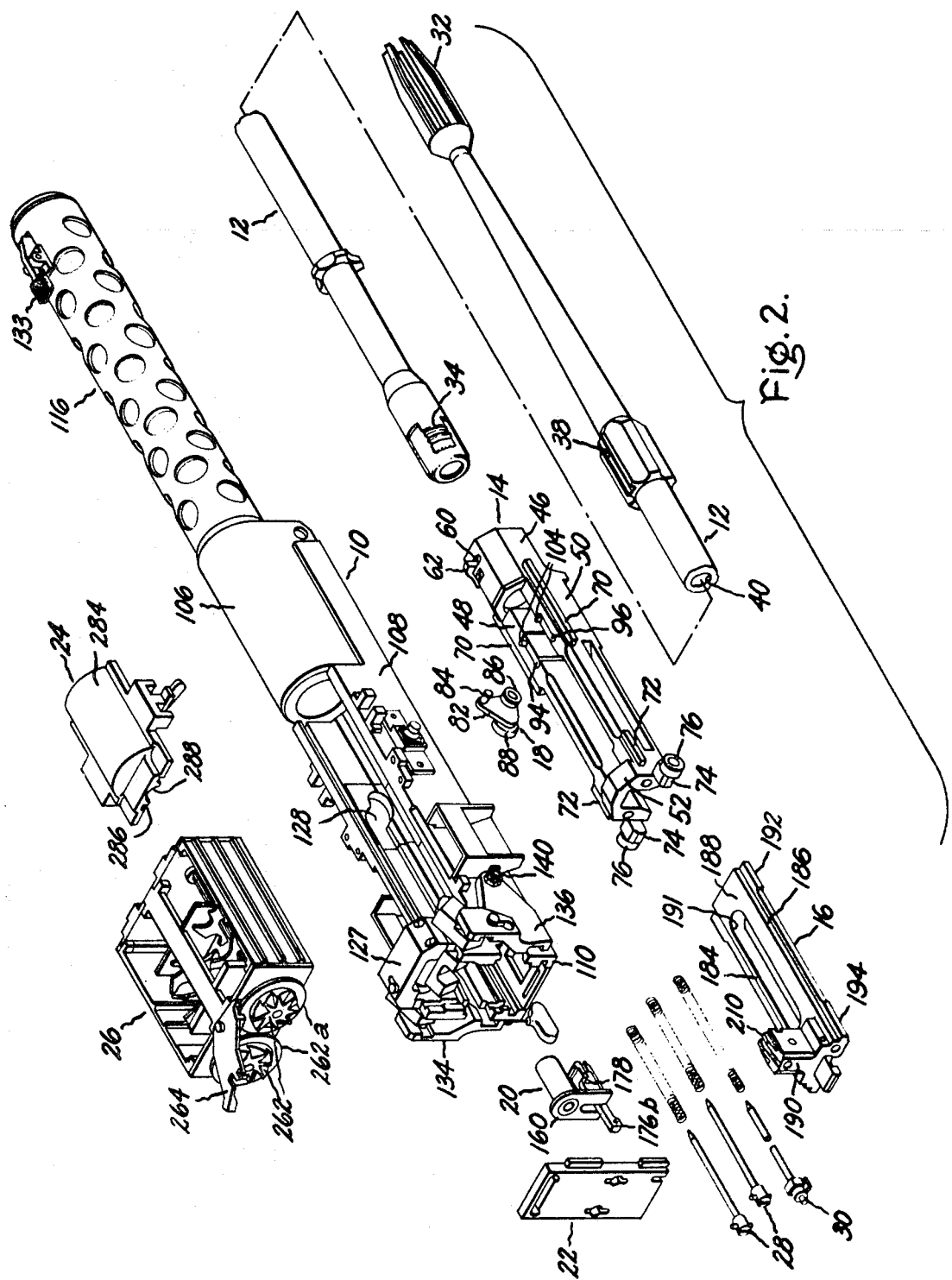
FIG. 2 is an exploded perspective view of the subassemblies of the machine gun of FIG. 1.

The embodiment shown in the drawing includes a receiver assembly 10, a barrel assembly 12, a barrel extension assembly 14, a bolt assembly 16, a bolt accelerator assembly 18, a bolt buffer and sear assembly 20, a backplate assembly 22, a locking cam assembly 24, a feeder assembly 26, two barrel recoil spring assemblies 28 and a bolt recoil spring assembly 30.

The barrel assembly 12 includes a flash suppressor 32 threaded onto its forward end. The exterior of the aft end of the barrel has a plurality of interrupted threads 34, a clockwise dead-end slot 36; and the medial portion has a longitudinal slot 38. The barrel also has a longitudinal rifled bore 40, a transitional bore enlargement 42, and a chamber 44.

The barrel extension assembly 14 includes a forward annular portion 46, left and right medial, longitudinally extending, spaced apart, vertical web portions 48, 50, and a rear, arched portion 52 all defining a central, vertical aperture. The forward portion 46 has a longitudinal bore 54 with interrupted threads 56 (to engage the barrel threads 34), and a radial pin 58 (to be received by the barrel dead-end slot 36). The forward portion also has a cross-slot 60 in which a crank-arm detent 62 is pivotally mounted with its left arm 64 normally biased outwardly by a spring 66. Its right arm 68 is biased inwardly and is adapted to be deflected by the barrel to bring in the left arm. Each web portion 48, 50 has a forward guide-rib 70 and a rear guide-rib 72. Each side of the arched portion 52 has a respective rearwardly extending arm 74 pivotally mounting a respective cam roller 76. The left web portion 48 also has a cut-out surface 78 and a transverse blind-bore 80.

The bolt accelerator assembly 18 includes a triangular plate 82 (lying in the cut-out surface 78) having an inwardly directed transverse pivot pin 84 (journaled in the blind-bore 80), an inwardly directed cam roller 86 and an outwardly directed cam roller 88.

Each web portion 48, 50 also has a respective cut-out 90, 92 to receive, journal and support a respective locking lug 94, 96. Each lug has a substantially cylindrically shaped rear portion or knuckle 98 having a vertical axis which is journaled in a mating cylindrical cut-out subportion 100 in the respective cut-out portion. Each lug is supported vertically by the floor 102 of its respective cut-out. Each lug has a vertical, upwardly extending cam follower 104.

The receiver assembly 10 includes a forward annular portion 106, a medial portion 108 of U-cross-section, a rear portion 110 and a bottom aperture 111. The forward portion 106 has a rear internal flange portion 112 and a forward internally threaded portion 114 which receives the mating threaded portion 115 of a perforated barrel support and cooling jacket 116. An "Edgewater" multi-ring compression spring 118, serving as the barrel buffer, is captured between two collars 120, 122, which in turn are captured between the flange portion 112 and the tube portion 115. Each sidewall of the receiver has a lower bolt guide slot 124 and an upper barrel extension guide slot 126 (to receive the ribs 70, 72). A cross-piece 127 interconnects the upper aft ends of the sidewalls. The left side wall has a cam slot 128 (to receive the accelerator roller 88). The forward end of the cam slot has a concave downward sloped portion 130. To permit changes in the slope of the slot portion 130, the wall of the receiver may be cut to receive interchangable cam plates 132 having a desired cam slot. A spring loaded latch 133 is mounted at the forward end of the jacket to engage the slot 38 in the barrel.

A left feed cam plate 134 and a right feed cam plate 136 are externally pivotally mounted at 138, 140 respectively to the left and right side walls of the rear portion 110 of the receiver. Each cam plate has a respective cam slot 142 (to receive the barrel extension cam roller 76). Each cam plate has a travel limiting slot 144 which receives a limit pin 146 fixed to the respective side wall. Each cam plate also has a cam slot 148 for oscillating a feed drive 150 which includes a crank shaft 152 which is journaled through the side walls of the receiver and has end cam pins 154 respectively mating with the two cam slots 148. The shaft 152 carries, two, outer, spring loaded, downwardly driving, plungers 156 and two, inner spring loaded, upwardly driving, plungers 158, for driving the feeder assembly 26.

The back plate 22 supports the bolt buffer and sear assembly 20 and the solenoid trigger (not shown), and is secured to the rear of the receiver. The bolt buffer and sear assembly 20 includes a plate 160 having a tubular boss 162 which is internally threaded to receive a buffer cap bolt 164. A multi-ring, bolt buffer spring 166 is captured between an annular front buffer cap 168 and an annular, rear buffer cap 170, which are secured to the plate by the bolt 164, and enclosed by a dust cover 172. The rear buffer cap 170 includes a downwardly extending plate portion 170a, onto which is mounted a sear carrier 174 having a bottom portion and two side wall portions. The bolt sear 176 is mounted to the carrier by a sear pin 178 and has its forward hook 176a biased upwardly by a sear spring 180. The rear of the sear 176b extends rearwardly of the back plate and is adapted to be pulled upwardly to trigger the sear.

The bolt assembly 16, here shown, is adapted to electrically fire ammunition. The assembly includes a bolt 182 having a left side wall 184, a right side wall 186, a front transverse wall 188, a rear transverse column 190 and a central aperture 191. A front guide rib 192 and a rear guide rib 194 extend from the right side wall and mate with the receiver lower right guide slot 124. A front guide rib 196 and two spaced apart rear guide ribs 198, 200 extend from the left side wall and mate with the receiver lower left guide slot 124. A front guide rib 202 extends from the left side wall between the ribs 196, 198, and is adapted to support the inwardly directed cam roller 86 of the accelerator assembly. The slot 204 defined between the ribs 198, 200 is adapted to clear the cam roller 86, and a step-block 206 formed on the rib 200 is adapted to receive and to block the cam roller 86. A downwardly directed bolt hook 208 extends rearwardly from the column 190 and is adapted to engage the sear hook 176a. A rammer is formed as a projection 210 on top of the column 190. An extractor 212 having an upwardly directed hook is disposed in a longitudinal bore 214 in the column, is captured by and pivotal about a cross-pin 216, and is biased upwardly by a spring loaded plunger assembly 218. A firing pin 220 is spring loaded in a transverse insulated bore in the column and connected to an insulated contact 222. When the bolt is in its forward, battery position, the contact 222 is adapted to engage a spring loaded insulated contact 223 projecting inwardly from the right side wall of the receiver, to provide a path for firing current to the primer of the round of ammunition.

The feeder assembly 26, here shown, provides for selective, alternative feed from either of two supplies of ammunition, and is driven by the feed drive 150 built into the rear of the receiver housing. The feeder assembly comprises a U-shaped housing including a front wall 224, and a rear wall 226, integral with the left hand tray 228 and a right hand tray 230, and interconnected with a left side plate 232 and a right side plate 234. A left hand splined shaft 236 and a right hand splined shaft 238 are journaled through and between the front and rear walls 224, 226. A top connecting bar 240 extends between the front and rear walls 224, 226 and includes a front, transverse ammunition guide plate 242 and a rear, transverse ammunition guide plate 242 and a rear, transverse ammunition guide plate 244. The edge of the plate 244 includes a lip 244a adapted to abut the rear of the round ammunition. The interior surfaces of the side plates 232, 234 include appropriate slots 235 to receive and guide the ammunition links, not shown. A respective front, short hook shaped ammunition guide 246 extends upwardly-outwardly from each tray 228, 230, and a respective rear, long hook shaped ammunition guide and link stripper 248 extends upwardly-outwardly from each tray 228, 230. A respective front, four hooked sprocket 250, and a respective rear, four hooked sprocket 252 are fixed on each shaft 236, 238. A respective eight toothed ratchet wheel 256 is fixed on the front end of each shaft 236, 138, and is dogged by a ratchet 258 which is biased by a spring loaded plunger 260. A respective eight toothed drive-ratchet wheel 262 having a base flange 262a is slidably-splined onto each shaft 236, 238. A switch plate 264 is pivotally mounted to the top bar 240 and has two fork structures, each engaging a respective base flange 262a, whereby the plate is adapted to move either the right hand wheel rearwardly into engagement with the right hand driving plungers 156, 158, and the left hand wheel forwardly, out of engagement; or the left hand wheel rearwardly into engagement with the left hand driving plungers 156, 158 and the right hand wheel forwardly, out of engagement. Two depressor springs 266, are fixed to a block 268 which is integral with the top bar 240, encircle a respective shaft 236, 238, and extend between the front and rear sprockets. The front and rear depressor guides 270, 272 are spring loaded in vertical bores in said block and extend downwardly over the tray aperture. In operation, a left hand belt of ammunition is fed into the left hand sprockets, and a right hand belt of ammunition is fed into the right hand sprockets. Assuming that the right hand drive ratchet wheel is switched rearwardly, when the cam plates 136 are swung upwardly by the barrel extension in recoil, the feed drive shaft 152 is cranked downwardly and the outer right drive plunger drives the right ratchet wheel 45° clockwise. When the cam plates 136 are swung downwardly by the barrel extension in counter-recoil, the feed drive shaft is cranked upwardly and the inner right drive plunger drives the right ratchet wheel 45° clockwise further. As the right ratchet wheel rotates, the hook-arms on the right hand sprockets engage the next successive round of ammunition, drawing it downwardly between the guide plates, with the long guide hook-stripper separating the clip from the round on the recoil impulse, and delivering the round against the depressor spring. On the recoil impulse, the round is pushed by the next successive round past the depressor springs and past the depressor guides onto the tray aperture. The rammer projection of the bolt rides up through and along the tray aperture and pushes the round up against the depressor guides as it passes thereunder. The width of the tray aperture is narrower towards the rear, and widens forwardly. The left hand operation of the feeder is mirror symmetrical to the above described right hand operation. The stripped clip passes out of feeder through a short chute 283.

A cover plate and locking cam assembly 24 is mounted on the receiver assembly, forward of the feeder assembly. The rear underside of the plate 284 has two spaced apart cam slots 286 which respectively receive the cam followers 104 of the locking lugs 94, 96. When the barrel extension moves rearwardly in recoil, the cam slots swing the locking lugs outwardly, into their seats, to permit rearward movement of the bolt. When the barrel extension moves forwardly in counter-recoil into battery, the cam slots swing the locking lugs inwardly, from their seats, behind the bolt, to lock the bolt forward. A conical cavity 288 is formed into the rear underside of the plate between the cam slots, and serves to guide the round of ammunition downwardly, towards the gun barrel axis, as the round is moved forwardly along the tray aperture by the bolt rammer.

Two barrel recoil springs 28 are disposed in respective longitudinal blind bores in the barrel extension. One bolt recoil spring 30 is disposed in a respective longitudinal blind bore in the bolt. The three springs are compressed in recoil against the back plate 22.

In considering the operation of the weapon per se, assume that initially the bolt is in its full recoil position and its hook engaged with the sear hook, and a round of ammunition disposed on the lips of the tray defining the feed tray apertures. In this disposition the bolt driving spring 30 is fully compressed. The barrel extension assembly and the barrel are also in their full recoil disposition and are locked in this disposition by the interengagement of the accelerator assembly with the barrel extension assembly and the receiver housing, with the accelerator assembly being held up by its cam roller 86 riding on the intermediate guide rib 202 of the bolt 182. The barrel recoil springs 28 are also fully compressed.

When the trigger lever 176b of the sear is swung upwardly, the sear hook is lowered, disengaging the bolt hook and releasing the bolt which is driven forward by the bolt recoil spring within the presently stationary barrel extension assembly. The rammer projection on the bolt travels in and along the feed tray aperture and drives the round forward along the widening aperture. As the round travels forward, its nose is deflected downwardly by the conical cavity 288 in the underside of the cover plate 284, so that the nose enters the chamber 44 of the barrel. As the bolt travels forward, the barrel extension and barrel assemblies are held stationary by the accelerator assembly which is locked against rotation by virtue of its fixed pivot 84 in the barrel extension, the cam roller 88 being held up in the upper portion 128 of the accelerator cam slot in the receiver, and the cam roller 86 being held by the intermediate rib 202 on the bolt. As the bolt continues to travel forward, the intermediate rib rides along under the cam roller 86 until the slot 204 is under the cam roller 86, clearing the accelerator assembly for rotation. When the step block 206 on the bolt strikes the cam roller 86 it drives it downwardly into the slot 204, rotating the accelerator plate 82 about the pivot 84 and driving the cam roller 88 downwardly-forwardly along the accelerator cam slot 130 in the receiver, accelerating the barrel extension and barrel assemblies with respect to the stationary receiver and decelerating the bolt with respect to the barrel extension and barrel assemblies. As the bolt continues to drive forward, it continues to drive the round forward until the round is fully chambered, with the extractor plate of the round disposed between the rammer projection 210 and the extractor 212 of the bolt, and the bolt and barrel extension and barrel assemblies moving forward at the same velocity. The cam slots 286 in the stationary cover plate engage the cam followers 104 and swing the locking lugs 94, 96 out of their pockets in the moving barrel extension into their locking position behind the relatively stationary bolt, to lock the bolt behind the chambered round. When the locked together bolt and barrel extension and barrel assemblies reach their battery station in the stationary housing, firing current passes through the bolt to the firing pin 220, to fire the chambered, locked round.

When the round is fired, which occurs slightly forward of battery in the overtravel absorbed by the forward buffer, the locked together bolt and barrel extension and barrel assemblies recoil together, permitting the gas pressure in the barrel to decay until the cam slots in the stationary cover plate engage the cam followers 104 and swing the locking lugs 94, 96 into their pockets in the moving barrel extension to unlock the relatively stationary bolt. The accelerator cam roller rides up the accelerator cam slot 130 in the stationary receiver, swinging the accelerator plate 82 and causing the accelerator cam roller 86 to drive the step block 206 and the bolt rearwardly with respect to the barrel extension assembly. As the bolt accelerates rearwardly, its extractor 212 withdraws the fired case from the chamber 44, and this fired case pivots downwardly about the extractor through the apertures in the bottoms of the bolt assembly, the barrel extension assembly, and the receiver assembly, out of the weapon. Meanwhile, the feeder disposes the next round on the tray. The barrel extension and barrel assemblies are halted in recoil by the front buffer, while the bolt is halted in recoil by the rear buffer. If the trigger is operated, the sear hook will be depressed and will not engage the bolt hook, permitting the bolt to counter-recoil, as previously described. If the trigger is not operated, the sear hook will engage and halt the bolt.

Any suitable charging device may be coupled to the bolt assembly through a longitudinal slot through the left sidewall of the receiver assembly.

While the preferred embodiment herein shown and described includes a specific combination of bolt accelerator means, bolt locking means, feeder drive means and feeder means, it will be obvious that each of these means has utility in other gun combinations, and that certain changes in the form and arrangement of the parts and in the specific manner of practicing the invention may be made without departing from the underlying idea or principles of this invention with the scope of the appended claims.

What is claimed is:

1. An at least partly self acting gun which comprises, in combination:
 a receiver having a longitudinal axis;
 a barrel extension, disposed for recoil and counter-recoil movement in said receiver along said longitudinal axis, having
  two transversely spaced apart side walls with respective interior surfaces defining a longitudinally extending ejection opening, and two, symmetrically with respect to said longitudinal axis, laterally spaced apart blind pockets, each extending into a respective side wall and opening into a respective interior surface and said ejection opening, the aft end of each of said pockets being respectively formed with a partially circular cross-section;
a bolt, disposed for recoil and counter-recoil movement in said receiver along said longitudinal axis having
    a web, mounted in and to said receiver below said barrel extension, extending longitudinally along said longitudinal axis and transversely between said side walls of said barrel extension, and having an aft and a forward portion,
    a bolt-head, extending upwardly from said aft portion, into said ejection opening and moveable longitudinally therein,
    said forward portion of said web having a laterally central, longitudinal extending, cartridge case passing, ejection aperture;
two lugs, each disposed in and carried by a respective one of said pockets, having a respective cam follower, and a respective aft end formed with a partially circular cross-section and mating with said respective pocket aft end to form a pivotable connection therewith; and
two cam slots provided in said receiver, each receiving a respective one of said cam followers;
whereby, during counter-recoil movement of said barrel extension and said bolt, said cam slots operate upon said cam followers to pivot said lugs partially out from said respective pockets to an end-on disposition behind and in abutment with said bolt-head, and during recoil movement of said barrel extension and said bolt, said cam slots pivot said lugs into their respective pockets to clear said bolt for aft movement relative to said bolt extension.

2. A gun according to claim 1, wherein:
said barrel extension includes
    a chamber forward of and opening into said ejection opening,
said lugs being mounted longitudinally aft of said chamber by a space just large enough to accommodate said bolt head, whereby when said lugs are traversed behind said bolt head, said bolt head is locked against and closes said chamber.

3. An at least partly self acting gun which comprises, in combination:
a receiver having a longitudinal axis;
a barrel extension, disposed for recoil and counter-recoil movement in said receiver along said longitudinal axis, having two transversely spaced apart side walls with respective interior surfaces defining a longitudinally extending ejection opening;
a bolt, disposed for recoil and counter-recoil movement in said receiver along said longitudinal axis, having
    a web, mounted in and to said receiver below said barrel extension, extending longitudinally along said longitudinal axis and transversely between said side walls of said barrel extension, and having an aft and a forward portion,
    a bolt-head, extending upwardly from said aft portion, into said ejection opening and moveable longitudinally therein,
    said forward portion of said web having a laterally central longitudinally extending, cartridge case passing, ejection aperture; and
said barrel extension includes
    a chamber forward of and opening into said ejection opening; and
    locking lugs mounted in the forward portion of said barrel extension longitudinally aft of said chamber by a space just large enough to accommodate said bolt head and disposable into said ejection opening, whereby when said lugs are disposed into said opening they are immediately behind and in compressive abutment with said bolt head, with said bolt head locked against and closing said chamber.

4. A gun according to claim 3, further including: means, coupled to said receiver, said barrel extension and said bolt, for accelerating and releasing said bolt aft with respect to said barrel extension, during recoil, subsequent to said lugs being withdrawn from behind said bolt.

References Cited

UNITED STATES PATENTS

| 639,421 | 12/1899 | Mauser | 89—176UX |
| 918,760 | 4/1909 | Mauser | 89—176 |

FOREIGN PATENTS

| 13,045 | 1901 | Great Britain | 89—176 |

BENJAMIN A. BORCHELT, Primary Examiner

S. C. BENTLEY, Assistant Examiner